US012240018B2

(12) United States Patent
Bromley et al.

(10) Patent No.: US 12,240,018 B2
(45) Date of Patent: Mar. 4, 2025

(54) BORE SQUEEGEE

(71) Applicants: Robert Lee Bromley, El Paso, TX (US); Jennifer Guan Bromley, El Paso, TX (US)

(72) Inventors: Robert Lee Bromley, El Paso, TX (US); Jennifer Guan Bromley, El Paso, TX (US)

( * ) Notice: Subject to any disclaimer, the term of this patent is extended or adjusted under 35 U.S.C. 154(b) by 390 days.

(21) Appl. No.: 17/804,560

(22) Filed: May 29, 2022

(65) Prior Publication Data

US 2023/0381835 A1 Nov. 30, 2023

(51) Int. Cl.
*B08B 9/04* (2006.01)

(52) U.S. Cl.
CPC .................................... *B08B 9/04* (2013.01)

(58) Field of Classification Search
CPC ............. B08B 9/04; B08B 9/043; B08B 9/02
See application file for complete search history.

(56) References Cited

U.S. PATENT DOCUMENTS 4,700,423 A * 10/1987 Zuliani .................. A47K 11/10 15/160
6,800,083 B2 * 10/2004 Hiblar ............ A61B 17/320758 606/171

* cited by examiner

*Primary Examiner* — Shay Karls

(57) ABSTRACT

A novel invention squeegee cleans in a first direction, manually or by robot, the inner surface of a bore referred to as a hollow-shape, comprising a longitudinal shaft with a distal end squeegee element, and a cooperatively aligned sheath. Said squeegee element is comprised of shape conforming flexible disks in combination with shape conforming flexible tabbed fins having incrementally sized surface openings to form an ascending or descending path to incrementally collect contaminants. From said first direction the invention exits said hollow-shape distal end, cleaning said inner surface. Said sheath is selectively moved from a first proximal position to a second distal position covering said squeegee element and isolating collected contaminants. A second opposite direction retracts said invention from said hollow-shape, with manual or robotic means, by removing said isolated contaminants preventing recontamination of said inner surface. The invention can be cleaned and reused multiple times before disposal.

4 Claims, 12 Drawing Sheets

SECTION B-B

SECTION C-C

SECTION D-D

SECTION F-F

BORE SQUEEGEE

US GOVERNMENT INTEREST

None

OATH AND DECLARATION

Yes

CROSS REFERENCE

Provisional Patent Application Number 63458826 filed on Jun. 1, 2021

US Class: USPC 15/104.05,104.061,118,210, 15/211, 15/104.05, 42/95, 128/269, 134/22.1, 600/157, 604/1-2,11, 385.01, 606/1,185, D22/199, D32/35

FIELD OF SEARCH

REFERENCES CITED

| | | | |
|---|---|---|---|
| 3,149,360 | September 1964 | Lend | 15/118 |
| 3,818,911 | June 1974 | Fournier | 128/269 |
| 4,178,649 | December 1979 | Kouse et al | 15/104.061 |
| 5,084,005 | January 1992 | Kachigian | 604/1 |
| 5,147,288 | September 1992 | Schiavo | 604/1 |
| 5,188,630 | February 1993 | Christoudias | 606/1 |
| 5,392,766 | February 1995 | Masterson et al | 600/157 |
| 5,407,423 | April 1995 | Yoon | 604/1 |
| 5,599,292 | February 1997 | Yoon | 604/11 |
| 5,700,239 | December 1997 | Yoon | 604/2 |
| D 393,115 | March 1998 | Bell et al | D32/35 |
| 7,112,184 | September 2006 | Bichsel et al | 604/1 |
| 7,211,061 | May 2007 | Maxwell | 604/1 |
| 7,454,812 | November 2008 | Lyle | 15/104.05 |
| 2009/0283115 | November 2009 | Dentico | 134/22.1 |
| 2011/0047853 | March 2011 | Williams | 42/95 |
| 2011/0230853 | September 2011 | Ihde | 604/385.01 |
| U.S. D651,684 S | January 2012 | Rogers | D22/199 |
| U.S. Pat. No. 8,480,699 | July 2013 | Ihde | 606/185 |
| U.S. Pat. No. 8,764,783 | July 2014 | Ihde | 606/185 |

BACKGROUND OF INVENTION

For simplicity of disclosure the term hollow-shape will be used to reference bores, pipes, conduits, tubes, cannula, lumina, or trocars and be represented as a simple cylinder in the drawings. Cleaning inner surfaces of hollow-shapes is a form of maintenance required for cleanliness. Prior art has many devices that are used to clean the inner surface of hollow-shapes. Said devices use a means designed to scrape, wipe, cut, or absorb contaminants from the inner surface of hollow-shapes. Advantages of this new and novel reusable invention will become obvious to those skilled in the art of cleaning hollow-shapes as damage or scratches of the inner surface is prevented by using a squeegee. The advantages are listed as: 1) comprising at least two shape conforming flexible elements having or not having openings on said flexible element surface, 2) openings sized and arranged on at least one squeegee element or on multiple squeegee elements regulate removal of debris and smeared fluids, 3) said squeegee can be cleaned for repeated use, 4) a cooperatively attached said sheath selectively covers or uncovers said squeegee element to collect or isolate contaminants, 5) a longitudinal shaft having a distal position for said squeegee, and 5) a first proximal means for manipulating said longitudinal shaft and a second proximal means for selective movement of said sheath from a first position to a second position, multiple times, by human or robot.

In the oil, gas, sewer and water industries, pipes or conduits are commonly cleaned by autonomous devices to clean the inner surfaces through mechanical scraping or abrasive means. Such remotely controlled or autonomous devices may be motorized or mobilized by fluid pressure to travel from one end of said pipe or said conduit to the opposite end completing a desired cleaning area.

For firearms and armaments, a bore is commonly cleaned with a shape conforming metal wire brush with brass bristles emanating radially from a common axis being pushed or pulled through said bore dislodging contaminants from said inner surface. After said brushing of said inner surface a shape conforming absorbent material such as a patch of cloth is pushed and/or pulled through to deposit a compatible lubricant and remove any fine particles left behind from said brushing.

In the medical field, prior art disposable devices are forbidden to be cleaned and reused after cleaning the bore or cannula portion of a trocar as they use initially dry absorbent materials which become saturated with biological material. For minimally invasive procedures, hollow-shapes of various types such as: bores, tubes, cannula, lumen, or trocars are used as a port through which instruments and scopes enter a biological abdominopelvic cavity to gain access internally. A scope having a camera lens and light source on the distal end must enter a clean hollow-shape to prevent contamination which would obstruct the surgeon's clear camera view of the surgical site. Prior art devices and methods used to clean hollow-shapes are not reusable such as: 1) a thin stick-like member with sufficient soft dry material attached to the distal end usually made of synthetic foam shapes, organic spun fibers, or wrapped gauze and 2) a larger shaft-like member sized to fit closely to said hollow-shape having a series of dry absorbent rings spaced apart on said distal end of said shaft-like member. Said prior art cleaning devices use a linear reciprocating motion in combination with rotation as a cleaning technique inside said hollow-shape. Said disposable devices use dry media to absorb liquids, collect contaminants, and become saturated, leaving debris or smearing on said inner surface when passing back through said hollow-shape. Since said devices are forbidden to be cleaned additional cleaning to remove smears and remaining debris require the use of a second or third disposable device before said scope can be inserted into said hollow-shape.

In prior art, saturated absorbent materials cannot achieve a contaminant-free squeegeed surface when passing through said hollow-shape. Prior art devices do not use non-absorbent shape conforming flexible disks or non-absorbent shape conforming flexible tabbed fins as well as include a protective sheath to isolate said collected contaminants to prevent recontamination of said inner surface. Prior art does not incorporate graduated surface openings as a means to control the collection of said contaminants, preventing the formation of a debris wavefront.

For purposes of describing the preferred embodiment of the invention, the following descriptions will be concerned with medical procedures and specifically laparoscopic procedures as described hereafter. As one skilled in the art can appreciate, this novel invention is primarily used for, but not limited to, medical use, but may be used in other industries having hollow-shapes that need a non-abrasive cleaning device for a squeegeed inner surface.

In the medical field of minimally invasive surgical procedures, such as laparoscopy et al, surgeons use primarily a trocar having a hollow-shape cannula or bore to pass a scope into a biological abdominal wall for visualization of the interior biological abdominopelvic cavity. Said hollow-shape has a seal at the proximal end to retain insufflation gas to expand the biological abdominopelvic cavity and prevent insufflation gas from escaping said inflated biological abdominopelvic cavity when instruments and devices are not inserted. Said scope consists of a camera lens and a light source for viewing and illuminating the dark internal cavity of a biological abdominopelvic cavity. Said hollow-shape is inserted through the abdominal wall by making a small incision in the epidermis. Said hollow-shape incorporating an internal removable sharp piercing component to push through said epidermal incision and beyond fat layers and muscular tissue until piercing the inside peritoneum, a lining found inside the biological abdominopelvic cavity. Said piercing of said tissues cause minor trauma to tissue and blood vessels yielding a certain amount of blood discharge; therefore, when said removable sharp piercing component is contaminated with blood and withdrawn through said hollow-shape, certain amounts of blood are transferred onto said inner surface of said hollow-shape. Said inner surface must be cleaned prior to inserting said scope to clearly view the inside of said biological abdominopelvic cavity; otherwise, said blood contaminants will obstruct the surgeon's camera view and light emission. After said inner surface of said hollow-shape is sufficiently cleaned said scope can be inserted to view said biological abdominopelvic cavity.

A second surgical condition exists for said hollow-shape's inner surface to become contaminated when biological material such as blood, irrigated saline, dissected tissue, and mucous material contaminate said scope during the practice of surgery. Said scope is susceptible to contaminants near a surgical site during surgical procedures through the accumulation of splashed debris and ejecting fluids. As a result, the distal end of said scope becomes contaminated and obstructs the camera view for said surgeon. Cleaning said camera lens and said light source requires removing said scope from said hollow-shape and wiping the distal end of said scope outside the biological body with clean media. The withdrawal of said contaminated scope through said hollow-shape contaminates said inside wall of said hollow-shape. Said hollow-shape remains in situ and the inner surface must be sufficiently cleaned in a time efficient manner before the scope can be reinserted for surgery to proceed. Prior art disposable devices use absorbent materials which become saturated and during removal smears said inner surface of said hollow-shape.

SUMMARY OF THE INVENTION

A novel invention to clean the inner surface of a hollow-shape using flexible non-absorbent materials in a series of shape conforming individual or integrated fins or disks, usually round but not limited to round, is referred to as a squeegee element. Said squeegee element consists of said shape conforming flexible disks proximally without surface openings in combination with said shape conforming flexible disks distally having graduated sized openings to create shape conforming flexible tabbed fins. At least one said squeegee is attached to a common longitudinal shaft typically made of a rigid or semi-rigid material having a concentrically cooperative sheath that selectively, uncovers or covers said squeegee for the collection of or isolation of said contaminants respectively. Said isolated contaminants cannot contact said inner surface of said hollow-shape when the invention is removed, leaving said hollow-shape free of contaminants and smears.

There are two distinct directions of movement through said hollow-shape. The first direction of movement is from the proximal end of said hollow-shape through and beyond the distal end of said hollow-shape. During said first distinct direction of movement the first contact of contaminants is by distal end shape conforming flexible tabbed fins and later shape conforming flexible disks. Said distally shape conforming flexible tabbed fins have the greatest ratio of opening to surface area whereas proximal shape conforming flexible tabbed fins have gradually smaller ratio of opening to surface area thereby incrementally collecting less contaminants by passing each successive said tabbed fin preventing the forming of said debris wavefront.

Regulating collected amounts of contaminants prevents a debris mass from forming distally, dripping, and overflowing said sheath distal end. An overflow would contaminate the distal edge of said sheath when covering said squeegee element. In the event of said distal edge sheath contamination, the invention can be removed from said hollow-shape. Said sheath is moved to uncover said squeegee element for rinsing said non-absorbable flexible elements and sheath for reuse. Since the first pass of the invention collected a great amount of contaminants creating said debris wavefront which overflowed, a second pass by said recently cleaned invention will remove any remaining contaminants left inside said inner surface. A single invention can be cleaned and reused multiple time.

The object of the invention is to provide a squeegee system that collects and isolates debris and smears. The combination of said debris and smears will be referred to as contaminants. The sequence of use for the invention is hereby described: the invention enters the proximal end of a hollow-shape in a first direction of movement, collecting contaminants inside said hollow-shape. Upon exiting said hollow-shape at the distal end, the invention has a first proximal means to hold stationary said longitudinal shaft with attached squeegee element while said second proximal means selectively moves said sheath from said first proximal position to said second distal position to isolate said collected contaminants for removal. Removal of the invention is through a second direction of movement from distal end to proximal end of said hollow-shape. Said sheath isolates said contaminants, keeping the inner surface of said hollow-shape from recontamination during removal. The first embodiment of a new and novel invention having a means of cleaning the interior of said hollow shape without damage or abrasive marks using non-abrasive flexible shape conforming elements forming a one-piece squeegee having constant equal diameter tabbed fins gradually increasing in width, while the aligned gaps between said tabbed fins gradually decreases in size, until the gaps are so decreased in size as to create at least one constant uninterrupted circumference flexible element of said squeegee which is fixedly mounted to the distal end of said longitudinal shaft to insert into the first opening of said hollow shape thereby travelling inwardly gradually collecting said contaminants through slight interference between the outer perimeter of said squeegee and the inner surface of said hollow shape, until said squeegee completely exits the second opening of said hollow shape removing said contaminants.

In the course of cleaning various sized said hollow shapes and under various circumstances, it may be desirable to enter said first opening of said hollow shape and exit said squeegee at said second opening and then removing said squeegee back through said first opening. Therefore, a second embodiment combines said first embodiment with a means to isolate said contaminants by including a constant diameter thin-wall hollow sheath that can selectively move from a first position not covering said squeegee to a second position that covers said squeegee, thereby isolating said contaminants inside said hollow sheath so as not to re-contaminate said hollow shape when withdrawing said invention from said first opening of said hollow shape. Both embodiments are made of non-absorbent material suitable for cleaning and reuse multiple times.

One skilled in the art can see that said invention can have numerous proximal end means to accommodate hand manipulation or robot attachment of said invention.

DETAILED DESCRIPTION OF DRAWINGS

In the following drawings a preferred embodiment is illustrated and described for laparoscopic surgical procedures; however, though the invention is depicted in a preferred embodiment it is not limited to said preferred embodiment and may be used for cleaning various types of hollow-shapes. The materials, production methods, and assembly techniques use commonly available technology. The main components of said invention comprise: a longitudinal shaft made from a variety of organic or thermoplastic materials using fabrication or injection molding techniques respectively, a sheath preferably made from a polyolefin but not limited to a polyolefin thermoplastic material extruded with thin walls and transparent color, a squeegee element made from an elastomeric material such as a thermoset or a thermoplastic, depending on application, by a casting mold or injection mold respectively, and finally a means to proximally manipulate said longitudinal shaft and said sheath each having a proximal shape of either manual or robotic configuration, generally made from fabricated metal, metal injection, or plastic injection.

The invention is suitable for cleaning said inner surface of many sizes of said hollow-shapes by using compatibly sized shape conforming flexible disks and shape conforming flexible tabbed fins. The invention cleans in said first direction without damage to said inner surface, and once contaminants have been removed from said inner surface, the contaminants are covered by said sheath to isolate said contaminants. Isolated contaminants are removed from said hollow-shape, preventing recontamination of said inner surface. After the withdrawal of the invention from said hollow-shape, said sheath is selectively moved back to said first proximal position to expose said squeegee as both will be rinsed and reused multiple times per surgery. The squeegee element also cleans said sheath inner surface while moving from a first position to said second distal position. Multiple uses per patient is a major distinction between prior art and this novel invention due all components using non-absorbent materials.

Figure 1:
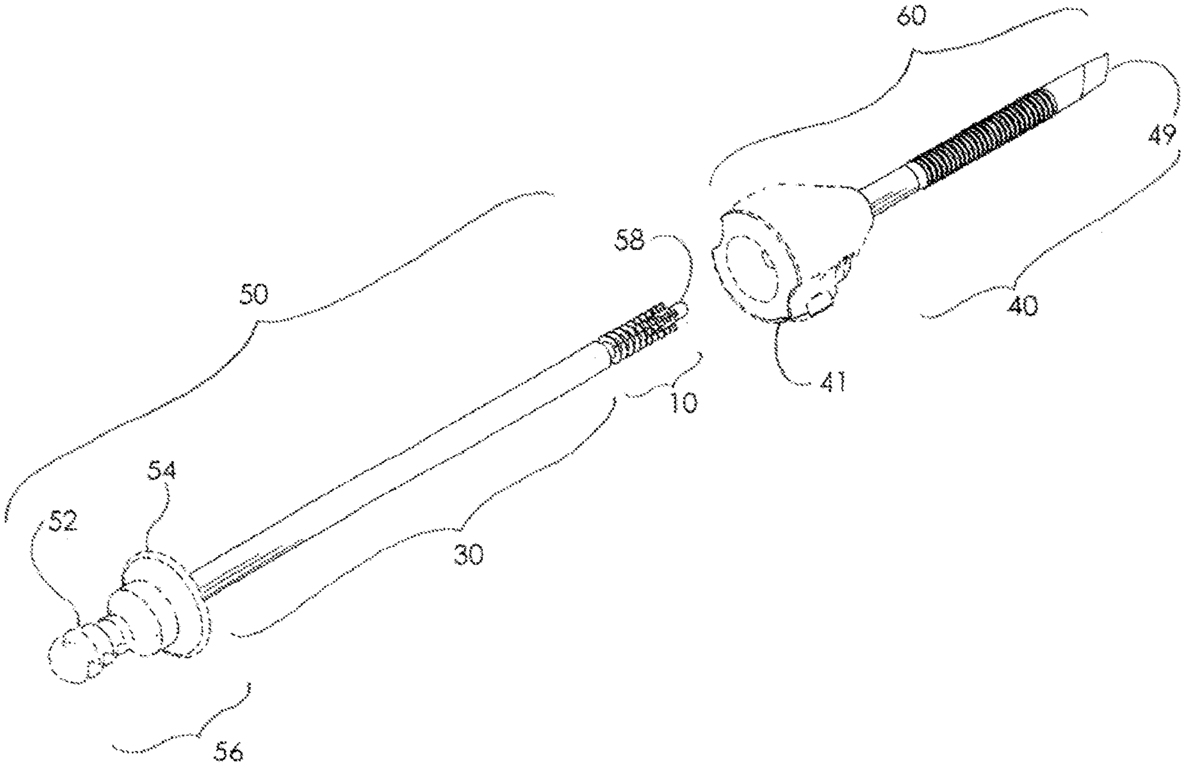
FIG. 1 shows the major components of the preferred embodiment

FIG. 1 shows the main components of the preferred embodiment excluding dashed lines on the proximal end 41 of the trocar 60 due to the many configurations of publicly available devices and excluding dashed lines on the proximal end 52 and 54 of the invention as the manipulation means is not part of this embodiment other than to depict a proximal area 56 for manipulation either by human or robot. The sheath 30 is selectively moved by the proximal end 54 and is concentric to the longitudinal shaft 50. The distal end 58 of shaft 50 has the squeegee element 10. The trocar 60 has a distal end 49, proximal end 41, and a bore or canula 40 to be referred to as hollow-shape 40. The purpose of the invention is to squeegee said hollow-shape 40 removing contaminants such as debris or smeared fluids.

Figure 2:
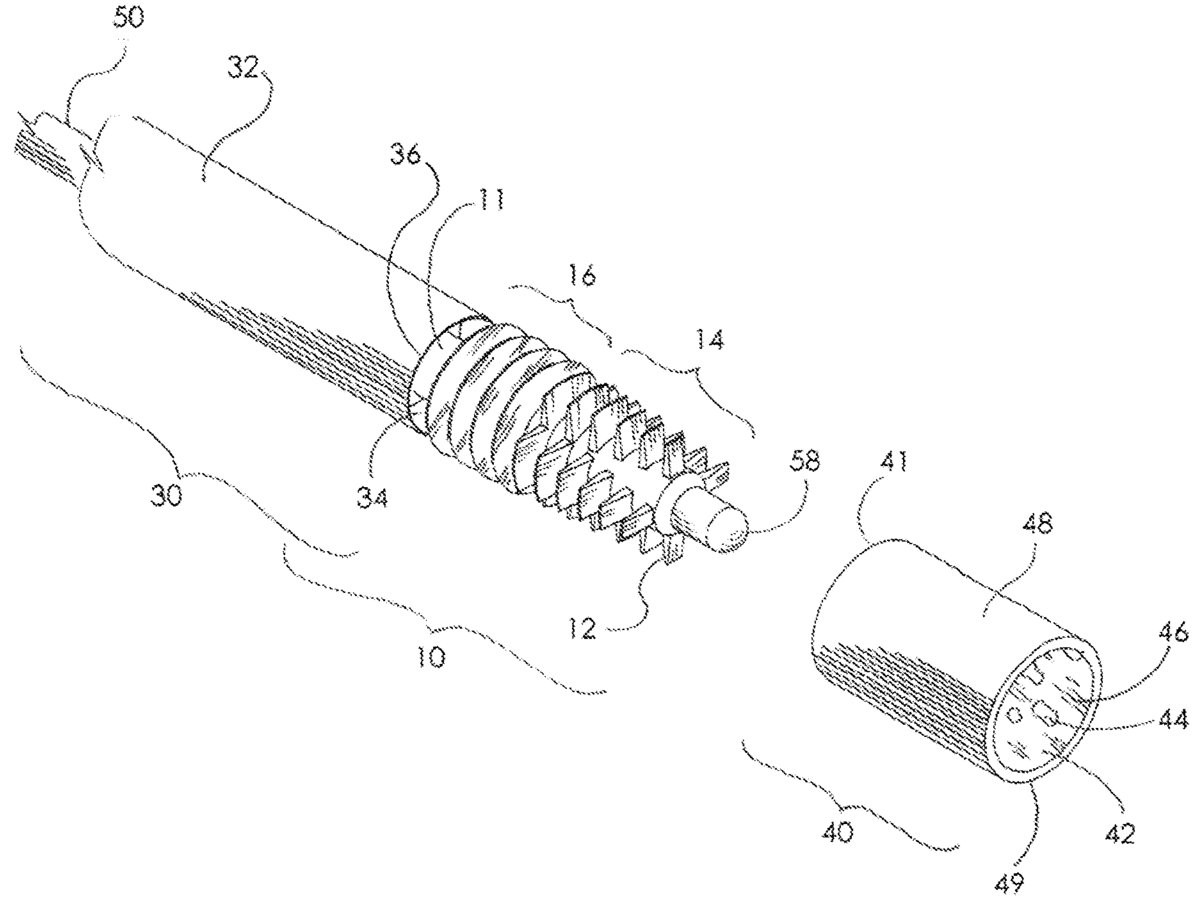
FIG. 2 shows said invention prior to entry into said hollow-shape

FIG. 2 is an isometric view of the preferred embodiment. The invention comprises an outer sheath 30 with an outer diameter 32, inside diameter 34, and a sheath distal edge 36, a squeegee element 10 having shape conforming flexible tabbed fins 14 of various sized surface areas caused by incremental edge openings 12 that progressively become smaller until each succeeding shape conforming flexible tabbed fins 14 becomes more and more circular. Proximal squeegee elements are said shape conforming flexible circular disks 16 in combination with said shape conforming flexible tabbed fins 14 rooted on a common sleeve 11 either integrally formed or secondarily attached to said sleeve 11 located near distal end 58, creating at least one squeegee unit 10 mounted to a longitudinal shaft 50 suitable for pushing or pulling the squeegee 10 through a hollow-shape 40, without becoming detached or dislocated. Hollow-shape 40 has an outer surface 48, a proximal end 41, a distal end 49, and inner surface 42 having debris 44 shown as outline shapes and smears 46 shown as parallel short lines.

Figure 3:
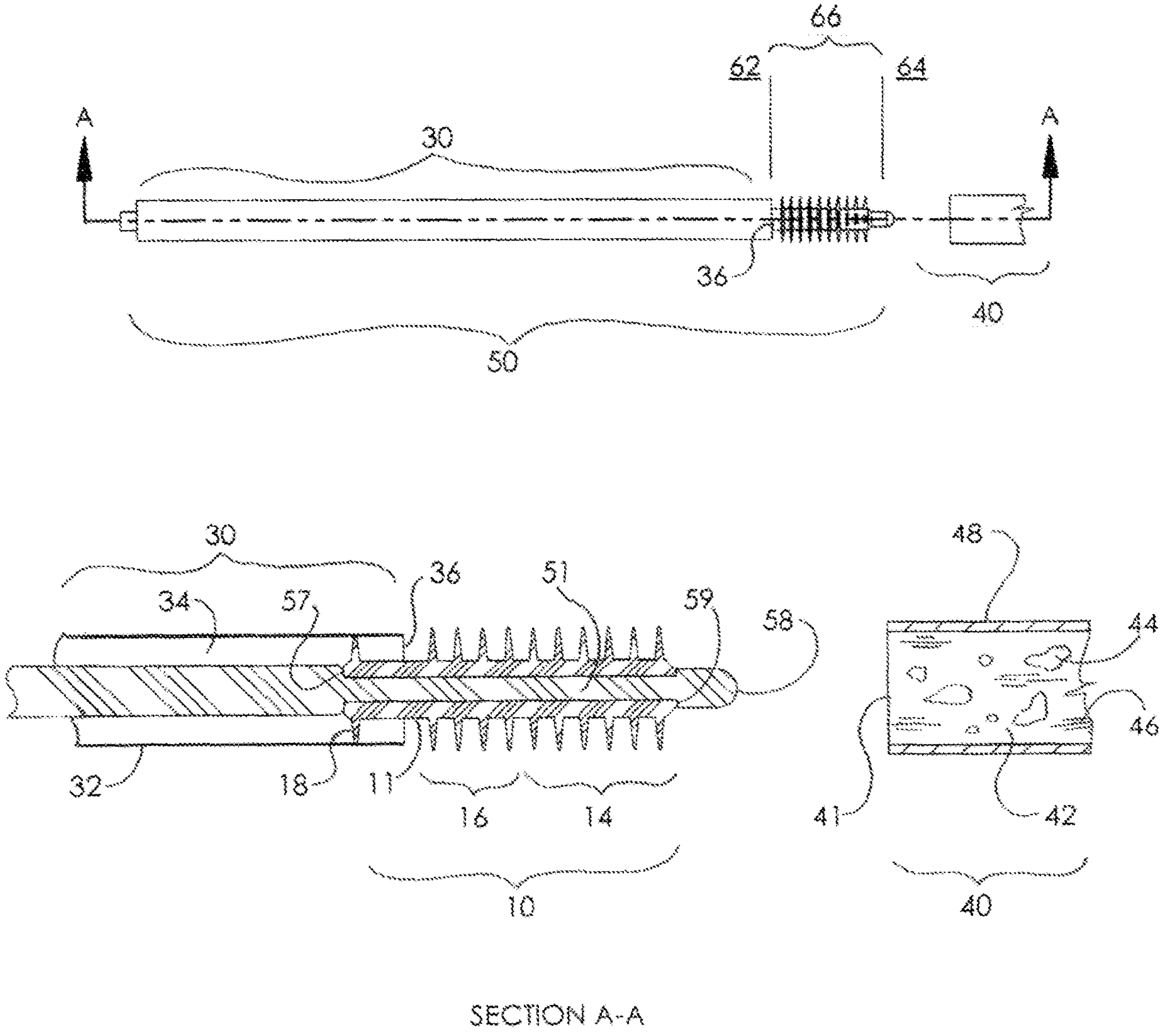
FIG. 3 shows a cross-section of said invention with a contaminated said hollow-shape

FIG. 3 shows a cross-section of the invention to better visualize said hollow-shape 40 having an outer surface 48, an inner surface 42 with said debris 44 and said smears 46 as well as the attachment means for the common sleeve 11 affixed to a smaller diameter shaft 51 retained between a proximal step 57 and distal step 59. Said sheath's 30 distal end 36, is shown in said first position 62 proximal to said squeegee 10. Said sheath 30 having an outside surface 32 and inner surface 34 is supported by a sheath conforming disk 18 to maintain concentricity minimizing the force to selectively move said sheath 30 over said squeegee 10. The first position 62 shown is used to insert the invention into the proximal end 41 allowing said squeegee 10 with said shape conforming flexible tabbed fins 14 and said shape conforming flexible disks 16, which both have a larger diameter than the inner surface 42, to squeegee hollow-shape 40. Said shaft 50 and said sheath 30 have a proximal end means 56 obvious to those skilled in the art, remains outside the biological body to manipulate the shaft 50, squeegee 10, and sheath 30. Said sheath 30 has a travel distance 66 of at least to second position 64, shown here for reference only.

Figure 4:
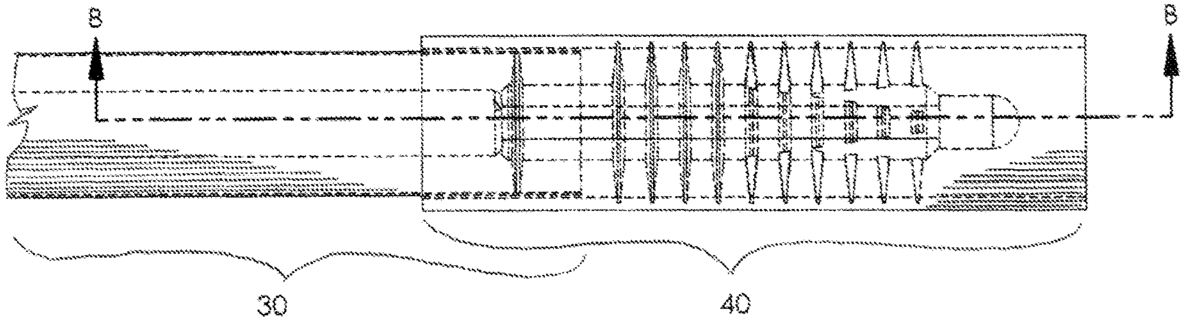
FIG. 4 shows a cross-section of component size relationships inside said hollow-shape
Figure 4:
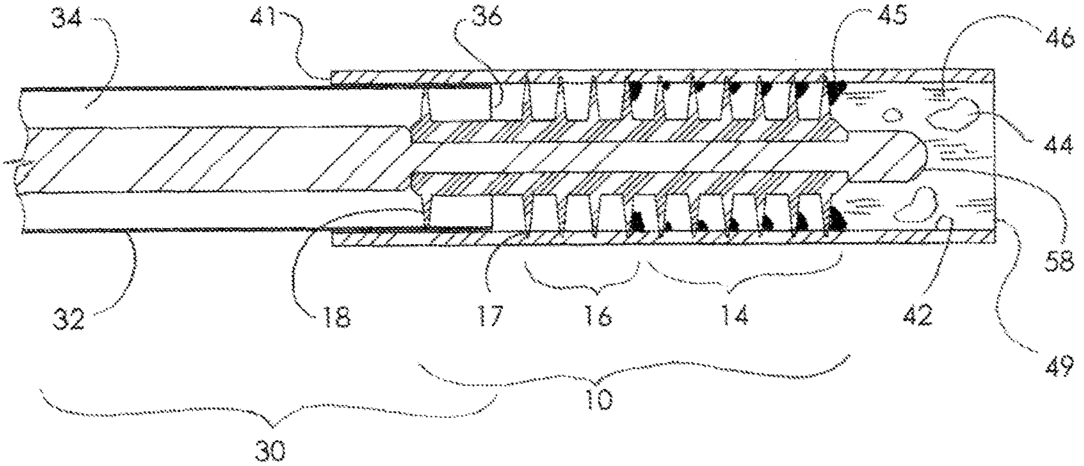

FIG. 4 shows the invention in side elevation and cross-section depicting the component size relationships entering the proximal end 41 of said hollow shape 40 and will exit distal end. Said squeegee 10 located near the distal end 58 has a slightly larger outer diameter than said inner surface 42 of the hollow-shape 40 creating interference 17 to squeegee the inner surface 42. Said sheath distal end 36 is held concentric by sheath conforming disk 18. Said collected contaminants 45 are shown as darkened areas to represent the combination of said debris 44 shown outlined and said smears 46 shown by short parallel lines. Said sheath's 30 outer diameter 32 is slightly smaller than said inside diameter 42 to allow free passage through said hollow-shape 40. Said sheath's 30 wall thickness between the inside diameter 34 and outside diameter 32 is as thin as possible to minimize friction on the shape conforming flexible tabbed fins 14 and shape conforming flexible disks 16.

Figure 5:
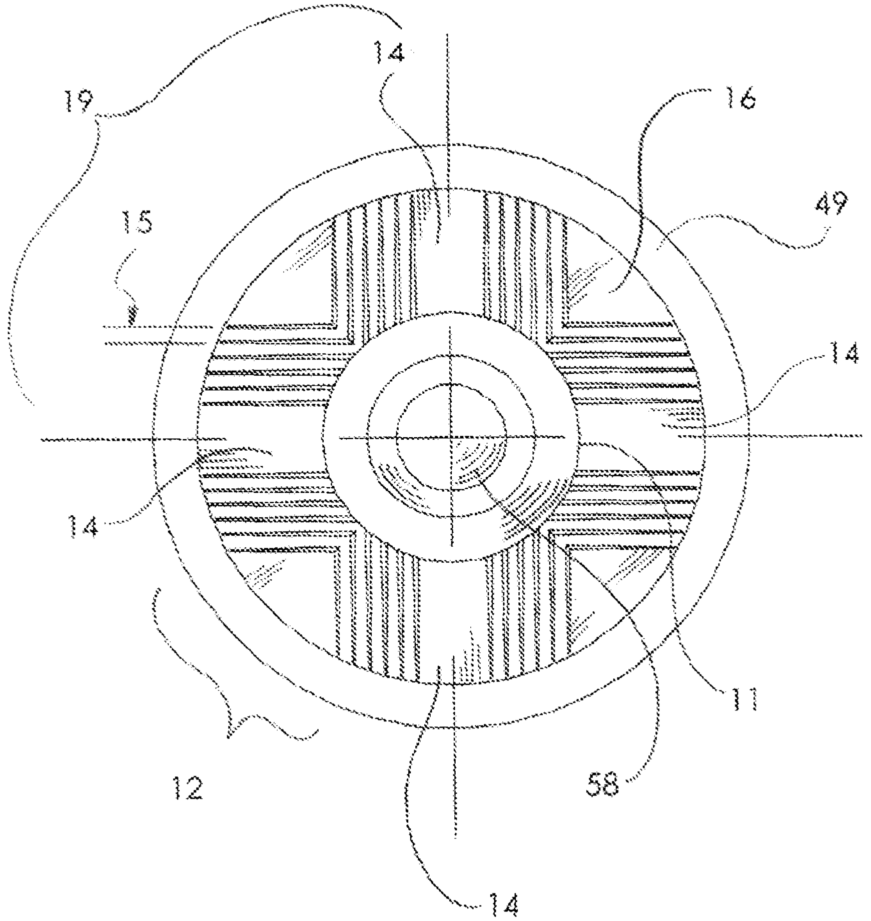
FIG. 5 shows a distal end view of said squeegee depicting stepped increments

FIG. 5 is an end view of said hollow shape distal end 49 and longitudinal shaft distal end 58 to show the incremental changes of said shape conforming flexible tabbed fins 14 as subsequent fin steps 15. Said sleeve 11 is concentric to the distal end 58. The edges of said fin steps 15 form an edge opening 12 at 90 degrees equally spaced, but not limited to, equally spaced 90-degree intervals 19. The quantity of intervals 19 will be determined by the desired incremental increase or decrease of edge opening 12. For instance, 180-degree apart intervals 19 would have much larger edge openings 12 between said shape conforming flexible tabbed fins 14 leaving less initial surface area to collect contaminants as only two shape conforming flexible tabbed fins 14 are created, and due to less surface area compared to a set of four shape conforming flexible tabbed fins 14. Conversely, if the edge opening's 12 interval 19 is 30-degrees apart, the edge openings 12 would be smaller creating a more aggressive collection of debris on a set of six shape conforming flexible tabbed fins 14 due to more surface area compared to the depicted embodiment of four. Finally, any remaining edge opening 12 is closed upon reaching said shape conforming flexible disks 16.

Figure 6:
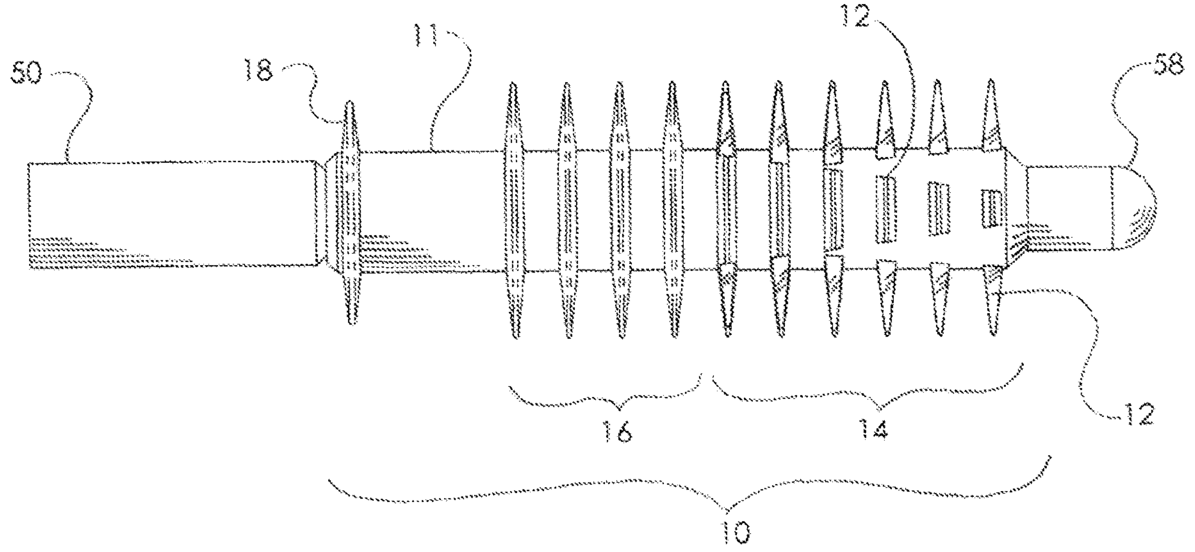
FIG. 6 shows the graduated decrease of openings from distal to proximal elements

FIG. 6 shows the progressive increasing size of said shape conforming flexible tabbed fins 14. The edge openings 12 are larger at the distal end 58 of the longitudinal shaft 50, making the first shape conforming flexible tabbed fins 14 the smallest. Each subsequent shape conforming flexible tabbed fins 14 on said squeegee 10 is slightly larger due to the incrementally smaller edge openings 12. Four proximal disks 16, but not limited to four, have uninterrupted peripheries and do not have surface openings. Shape conforming flexible tabbed fins 14, shape conforming flexible disks 16, and sheath conforming disk 18 are located on a single, but not limited to a single, sleeve 11.

Figure 7:
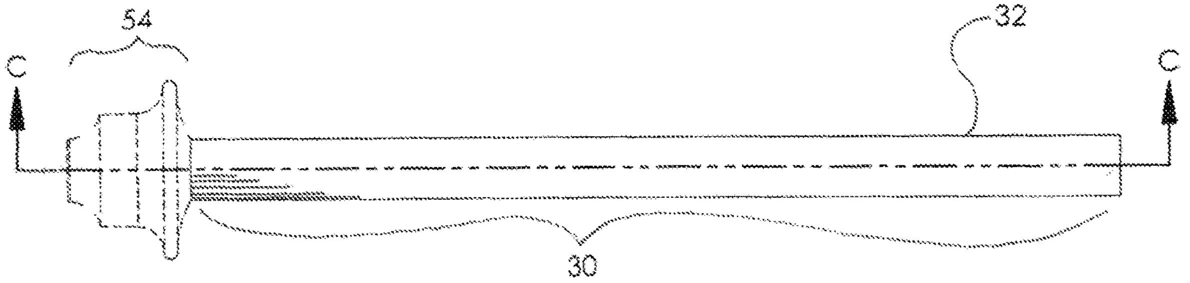
FIG. 7 shows said sheath with a proximal manipulating means
Figure 7:
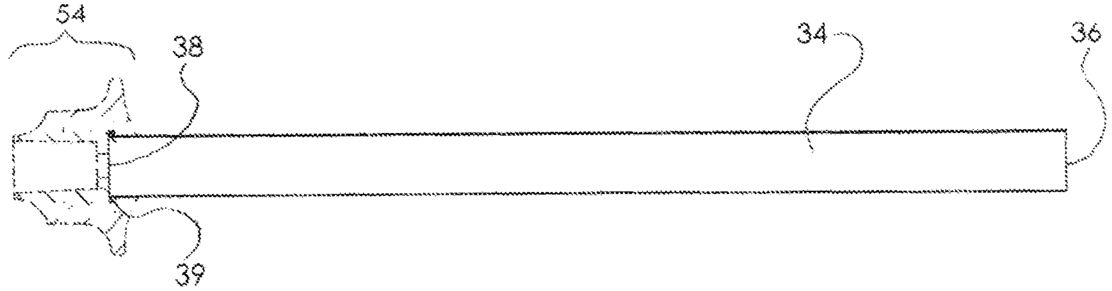

FIG. 7 shows the sheath 30 having a distal end 36, an outer surface 32, and inner surface 34 with a dashed line proximal end means 54 attached to the proximal end of said sheath 30, is obvious by those skilled in the art for manipulation by human or robot of the invention. A center passage 38 is required to allow said squeegee to selectively move in relation to said longitudinal shaft. The thickness between the inner surface 34 and outside surface 32 should be as thin as possible and is held in place by the dashed line proximal end means 54 to not detach. Said sheath 30 has a proximal end formed ring 39, but not limited to a ring, to retain said sheath 30 to proximal end means 54 as a cooperative single unit.

Figure 8:
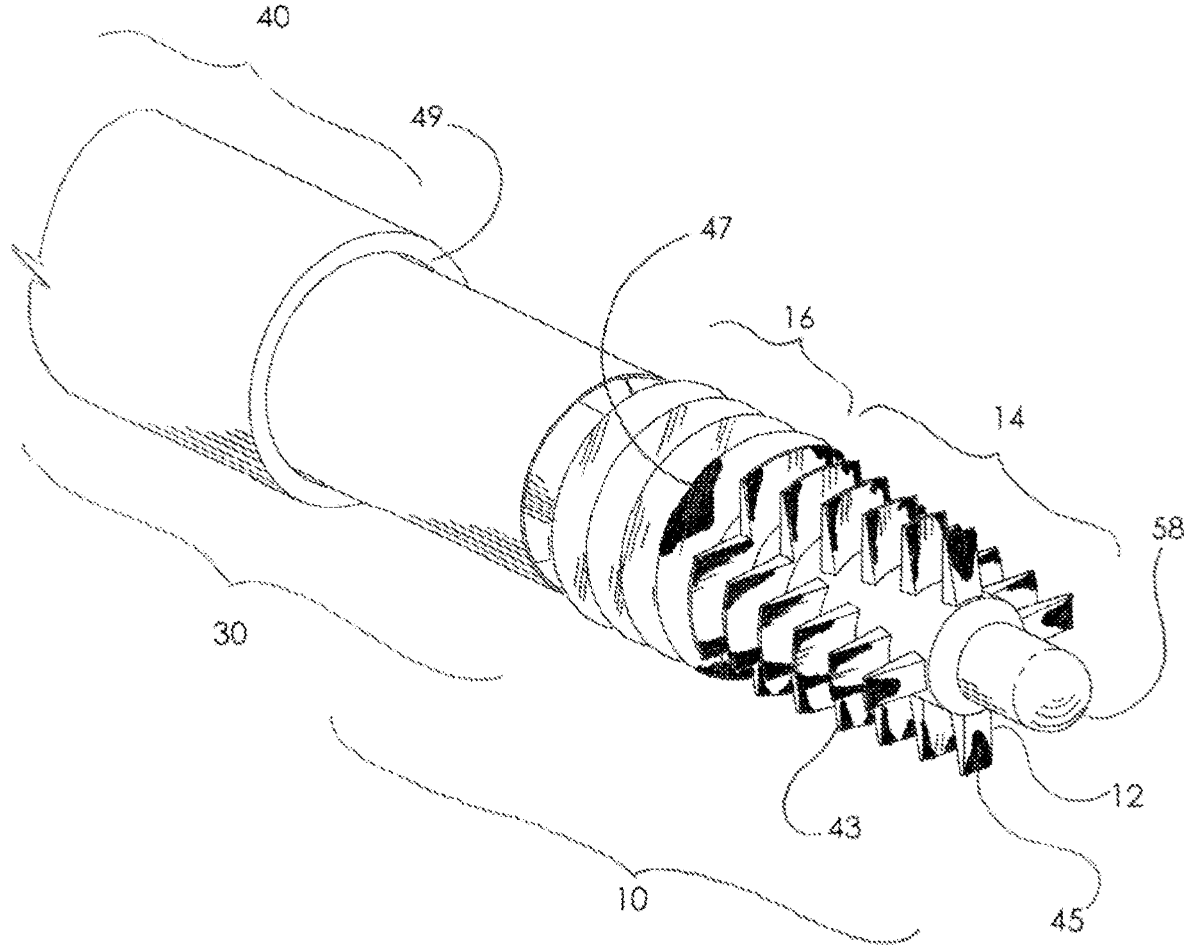
FIG. 8 shows said invention after first direction with collected contaminants

FIG. 8 illustrates the squeegee 10 and sheath 30 exiting the distal end 49 of the hollow-shape 40 after collecting contaminants 45, as indicated by dark areas. Contaminants 45 have been collected in a progressive manner onto each of said shape conforming flexible tabbed fins 14, thus preventing a buildup of contaminants from forming a debris wavefront. Near distal end 58 has shape conforming flexible tabbed fins 14 shown with top edge covered contaminants 45, while subsequent shape conforming flexible tabbed fins 14 have side edge covered contaminants 43 due to the passing of contaminants by the edge openings 12. Finally, the shape conforming flexible disks 16 have collected and squeegeed any remaining contaminants 47 left behind.

Figure 9:
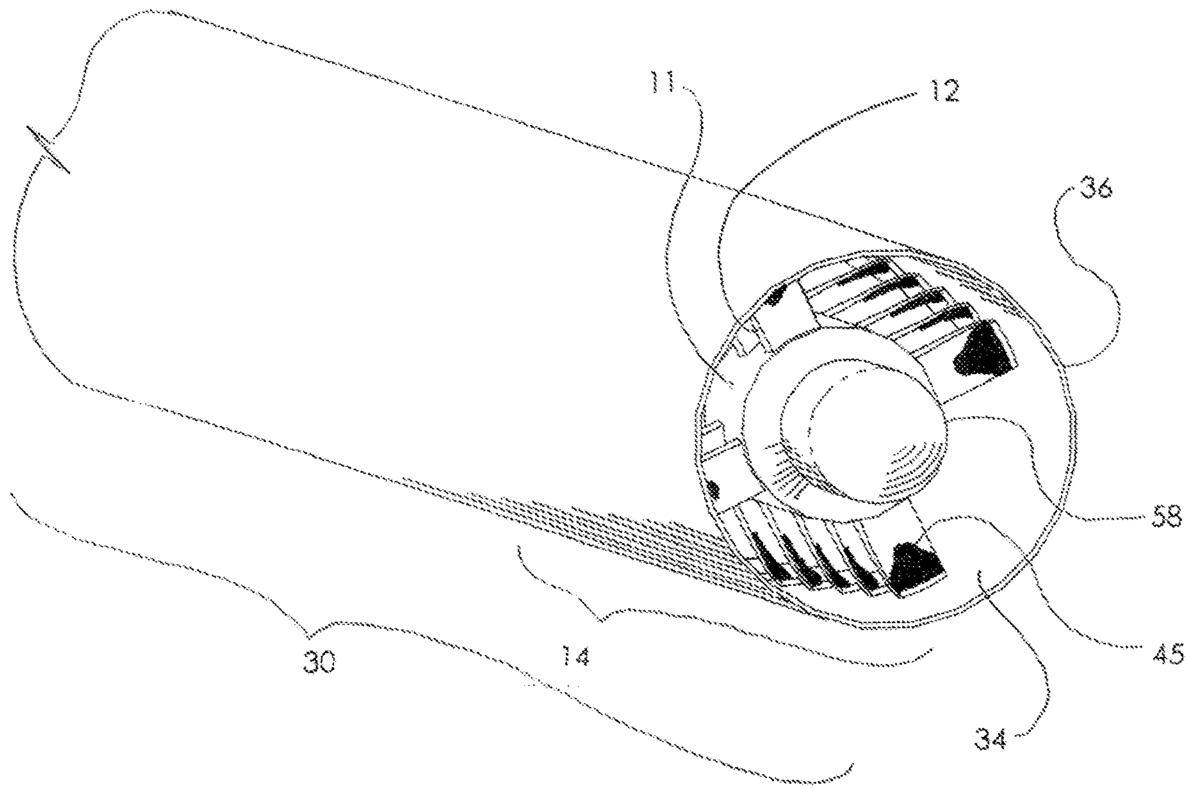
FIG. 9 shows a distal end view of said sheath isolating contaminants

FIG. 9 is a distal end 58 view shows said sheath distal end 36, sleeve 11, and edge openings 12 with shape conforming flexible tabbed fins 14, inside said sheath 30, having collected contaminants 45, as dark areas. Said sheath 30 isolates said contaminants 45 within said inner surface 34.

Figure 10:
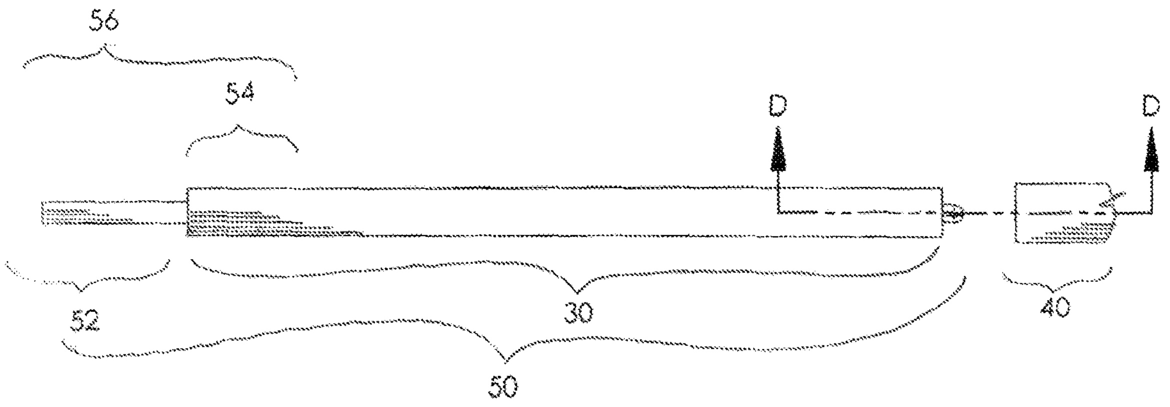
FIG. 10 shows a cross-section of the invention withdrawing from said clean hollow-shape
Figure 10:
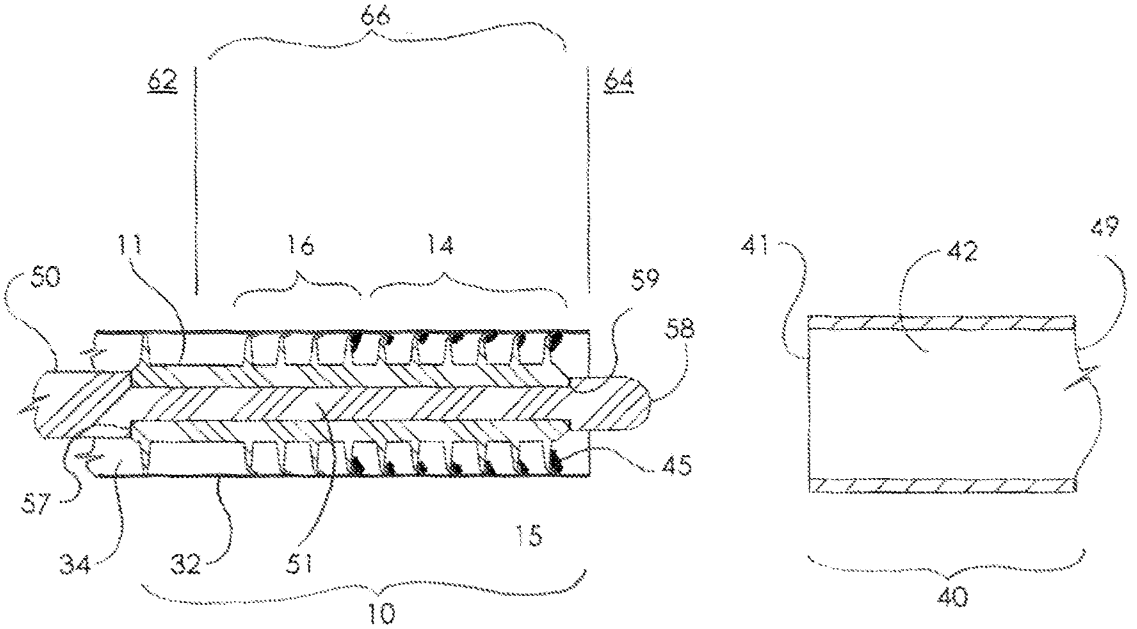

FIG. 10 is a side elevation and cross-section showing the invention retracted beyond the proximal end 41 of said hollow-shape 40 retaining collected contaminants 45, as shown by dark areas on the shape conforming flexible tabbed fins 14 and shape conforming flexible disks 16, within said sheath 30. A smaller shaft 51, near the distal end 58, concentrically aligns said common sleeve 11 of squeegee 10 as retained by distal step 59 and proximal step 57 to not detach or dislocate as may be caused by contact friction of said inner surface 34 of the sheath 30. Said outer surface 32 remains slightly smaller than said inner surface 42 after covering said squeegee 10. Said contaminants 45 as isolated, prevents contact with the inner surface 42 of hollow-shape 40 as the invention is retracted from the distal end 49 out the proximal end 41 of the hollow-shape 40. Said inner surface 42 has not been recontaminated and remains squeegeed.

Figure 11:
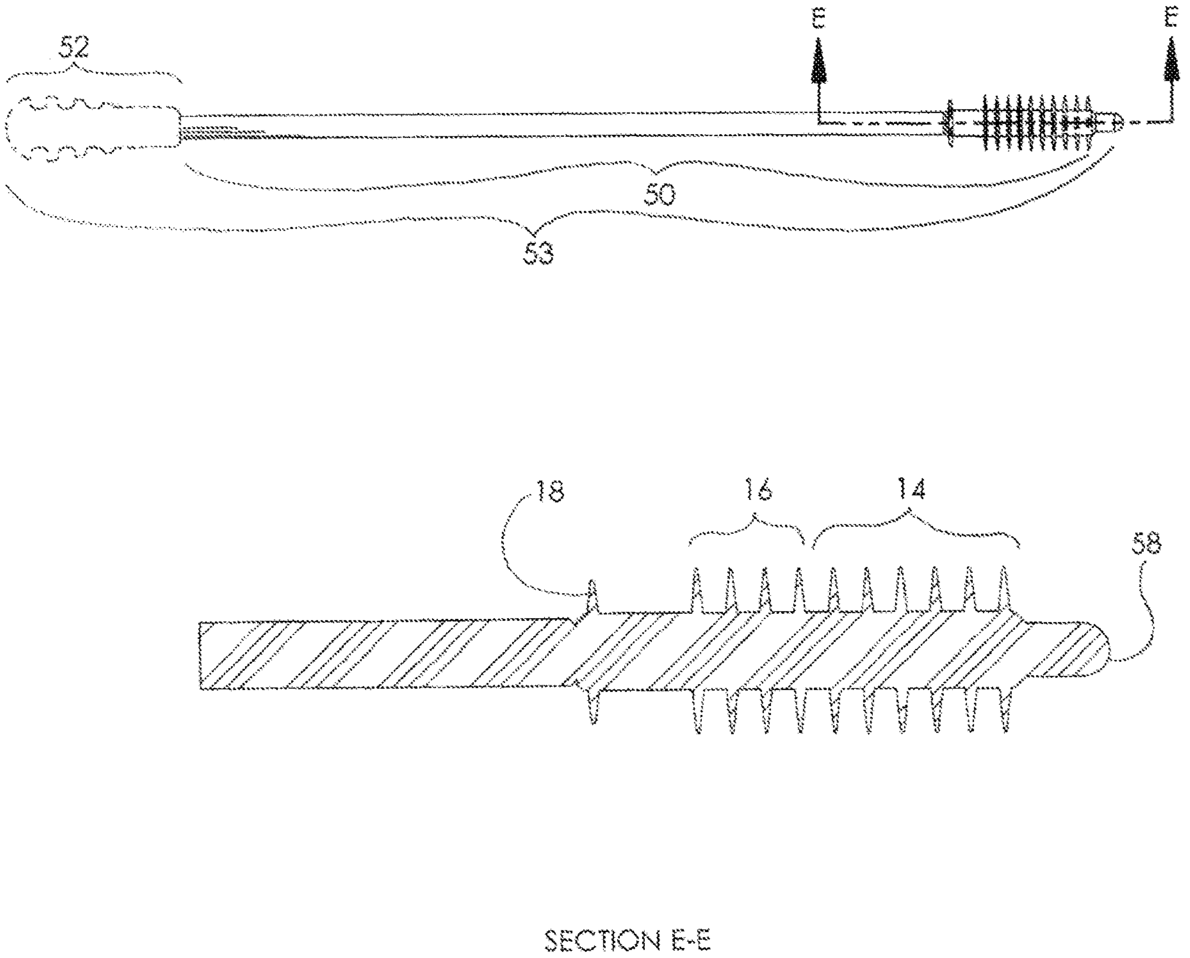
FIG. 11 shows an alternate construction of a one-piece squeegee element

FIG. 11 is an alternate one-piece construction embodiment of the invention showing a side elevation and cross-section of a one-piece unit 53 having a longitudinal shaft 50, a proximal means 52 for human or robot manipulation, and a distal end 58 integrating shape conforming flexible tabbed fins 14, shape conforming flexible disks 16, and sheath conforming disk 18.

Figure 12:
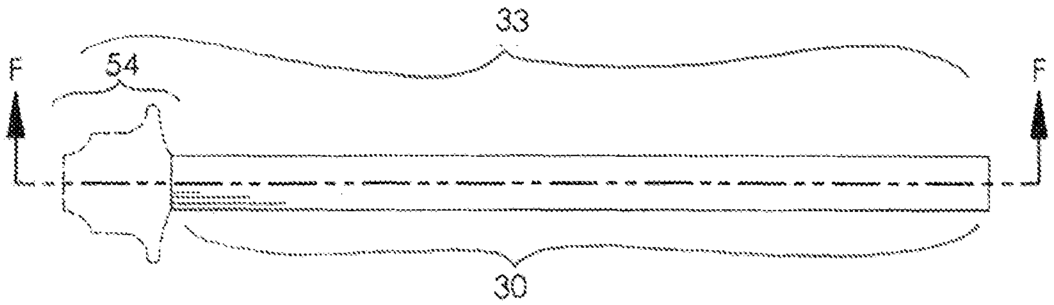
FIG. 12 shows an alternate construction of a one-piece sheath
Figure 12:
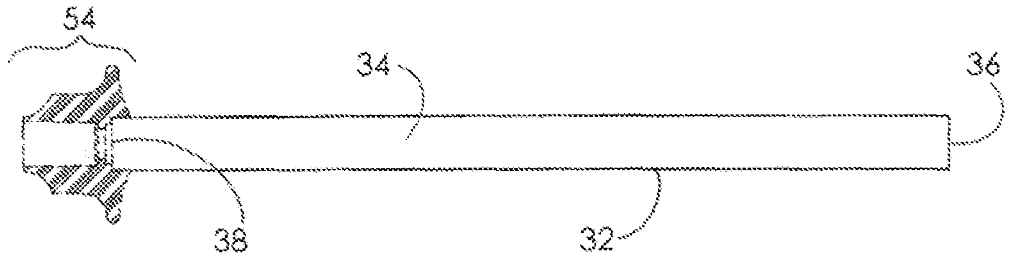

FIG. 12 is an alternate one-piece construction embodiment shows a side elevation and cross-section of a one-piece unit 33 having a thin wall sheath 30 and proximal means 54 for human or robot manipulation with a distal opening 36, centered passage 38, said outer surface 32 and inner surface 34. Said one-piece construction embodiment is cooperatively sized to be used in conjunction with said longitudinal shaft and said squeegee element.

What is claimed is:

1. A device to squeegee the inner surface of a hollow shape preventing damage or scratches with a non-abrasive material while cleaning comprising;

a longitudinal shaft with a distal end and proximal end, a first proximal means suitable for human or robot manipulation, said first proximal means is located on said proximal end of said longitudinal shaft, a non-removable one-piece squeegee comprising; flexible, shape conforming elements aligned and located on said distal end of said longitudinal shaft, wherein said flexible shape conforming elements have the same equal constant diameter, said shape conforming flexible elements are made of a non-absorbent material suitable to be rinsed and cleaned and reused multiple times, at least one said shape conforming flexible element is without perimeter openings, at least two adjacent said shape conforming flexible elements having perimeter openings, said perimeter openings in said adjacent shape conforming flexible elements are aligned openings incrementally sized, gradually changing in size from the squeegee distal end to the squeegee proximal end of said squeegee to regulate the collection of contaminates.

2. The device according to claim 1, further comprising;

a selectively movable constant diameter thin-walled hollow sheath, wherein said hollow sheath, comprises; a second proximal means suitable for human or robot manipulation, said second proximal means cooperates with said first proximal means, said hollow sheath selectively reciprocates from a first position to a second position along said longitudinal shaft, said first position not covering said shape conforming flexible elements, said second position covers said shape conforming flexible elements, said second position isolates said collection of contaminants within said hollow sheath, said hollow sheath selectively moved to said first position to expose said shape conforming flexible elements for cleaning, said hollow sheath comprises materials suitable to be rinsed clean and reused multiple times.

3. The device according to claim 1, comprised elements molded or formed as one piece.

4. The device according to claim 2, comprised elements molded or formed as one piece.

* * * * *